United States Patent
Atherton (10) Patent No.: US 7,952,516 B2
(45) Date of Patent: May 31, 2011

(54) SYSTEM AND METHOD FOR COHERENT FREQUENCY SWITCHING IN DDS ARCHITECTURES

(75) Inventor: Adam T. Atherton, Cicero, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 219 days.

(21) Appl. No.: 11/535,124

(22) Filed: Sep. 26, 2006

(65) Prior Publication Data
US 2008/0074311 A1    Mar. 27, 2008

(51) Int. Cl.
*G01S 7/28* (2006.01)
(52) U.S. Cl. .......... 342/200; 342/175; 342/201; 327/99; 327/105
(58) Field of Classification Search .......... 342/200, 342/202
See application file for complete search history.

(56) References Cited

U.S. PATENT DOCUMENTS

| | | | | |
|---|---|---|---|---|
| 5,151,661 A * | 9/1992 | Caldwell et al. | ............ | 327/107 |
| 5,311,193 A * | 5/1994 | Parkes | ............ | 342/201 |
| 5,708,436 A * | 1/1998 | Loiz et al. | ............ | 342/25 A |
| 5,963,607 A * | 10/1999 | Romano et al. | ............ | 375/373 |
| 5,970,053 A * | 10/1999 | Schick et al. | ............ | 370/252 |
| 6,064,241 A * | 5/2000 | Bainton et al. | ............ | 327/107 |
| 6,066,967 A * | 5/2000 | Cahill et al. | ............ | 327/107 |
| 6,075,392 A * | 6/2000 | Sandner | ............ | 327/145 |
| 6,522,176 B1 * | 2/2003 | Davis | ............ | 327/105 |
| 6,614,813 B1 * | 9/2003 | Dudley et al. | ............ | 370/532 |
| 6,774,832 B1 * | 8/2004 | Essenwanger | ............ | 341/143 |
| 6,778,138 B2 * | 8/2004 | Purdy et al. | ............ | 342/377 |
| 6,781,473 B1 * | 8/2004 | Chiu et al. | ............ | 331/177 R |
| 6,867,625 B1 * | 3/2005 | Stoyanov | ............ | 327/105 |
| 7,023,374 B2 * | 4/2006 | Jossef et al. | ............ | 342/20 |
| 7,081,777 B2 * | 7/2006 | Huang et al. | ............ | 327/99 |
| 7,268,594 B1 * | 9/2007 | Alfke | ............ | 327/105 |
| 7,281,025 B2 * | 10/2007 | Sullivan et al. | ............ | 708/271 |
| 7,284,025 B2 * | 10/2007 | Sullivan et al. | ............ | 708/271 |
| 2004/0080444 A1 * | 4/2004 | Meyers et al. | ............ | 341/159 |
| 2005/0003785 A1 * | 1/2005 | Jackson et al. | ............ | 455/260 |
| 2005/0134330 A1 * | 6/2005 | Sullivan et al. | ............ | 327/105 |
| 2005/0138094 A1 * | 6/2005 | Sullivan et al. | ............ | 708/270 |
| 2005/0141594 A1 * | 6/2005 | Smith et al. | ............ | 375/130 |
| 2006/0061407 A1 * | 3/2006 | Biswurm et al. | ............ | 327/407 |
| 2007/0063744 A1 * | 3/2007 | Matsumuro et al. | ............ | 327/99 |
| 2007/0164793 A1 * | 7/2007 | Kim | ............ | 327/105 |

OTHER PUBLICATIONS

Brain, Marshall. "How Radar Works." Apr. 1, 2000. HowStuffWorks.com. <http://science.howstuffworks.com/radar.htm/> Nov. 10, 2009.*

Skolnik, Merrill I. Radar Handbook. 2nd ed. McGraw-Hill, 1990. pp. 10.4-10.6.*

* cited by examiner

*Primary Examiner* — Thomas H Tarcza
*Assistant Examiner* — Matthew M Barker
(74) *Attorney, Agent, or Firm* — Daniel P. Malley; Bond, Schoeneck & King, PLLC (57) ABSTRACT

The present invention is directed to an integrated circuit device that includes a primary signal synthesizer configured to generate a free-running first digital frequency signal and at least one secondary signal synthesizer disposed in parallel with the primary signal synthesizer and configured to generate a free-running at least one second digital frequency signal. A switch element includes a first switch input coupled to the primary signal synthesizer and at least one second switch input coupled to the at least one secondary signal synthesizer. The switch element is configured to select a switch output that provides either the free-running first digital frequency signal or the free-running at least one second digital frequency signal based on a switch control input.

36 Claims, 4 Drawing Sheets

Fig. 4  CONVENTIONAL DDS

SYSTEM AND METHOD FOR COHERENT FREQUENCY SWITCHING IN DDS ARCHITECTURES

BACKGROUND OF THE INVENTION

1. Field of the Invention

The present invention relates generally to radar systems, and particularly to local oscillator implementations in radar systems.

2. Technical Background

The term "radar" is an acronym for the phrase "radio detection and ranging." A radar, therefore, transmits RF energy and listens for reflected return signals to detect a target and determine a target's location in space. The range is determined by what is commonly referred to in the art as the "radar equation." When the radar is disposed on a moving platform, such as a ship or an aircraft, target location may be provided as a relative bearing or a true bearing. The relative bearing is the angle of the target relative to the ship's heading, whereas a true bearing is referenced from true north, i.e., it is the sum of the ship's heading and the target angle. If the target is airborne, the target altitude is obtained by multiplying the target range by the sine of the target's elevation angle. The target range is a function of the transmitted power, the received power, the antenna gain, the wavelength of the electromagnetic energy, the radar cross-section of the target and the time delay between the transmitted. An overview of a conventional radar system is provided in light of the basic concepts discussed above.

Figure 1:
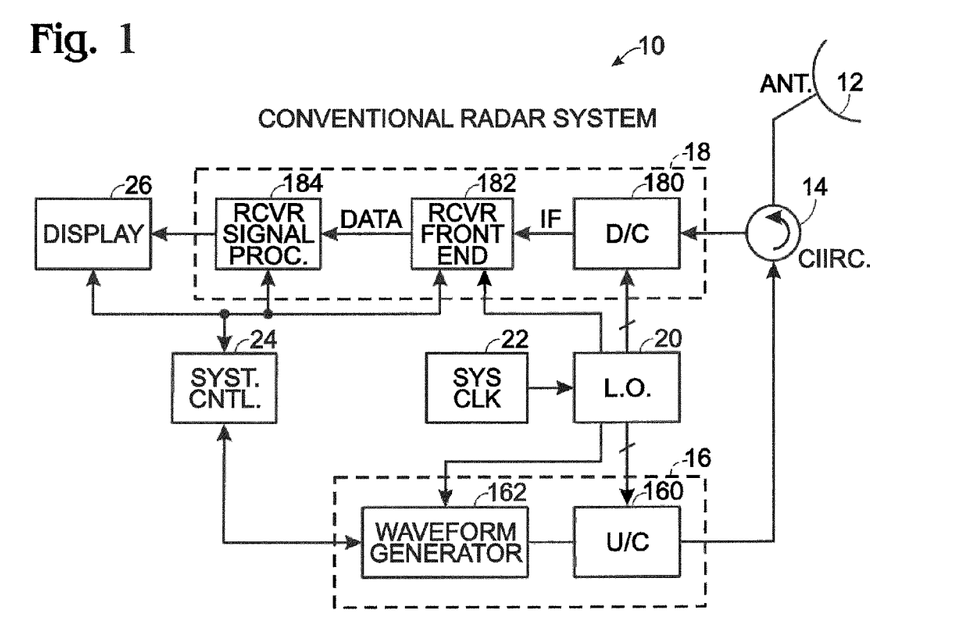
FIG. 1 is a simplified block diagram of a conventional radar system.

A simplified block diagram of a conventional radar system 10 is shown in FIG. 1. The conventional radar system 10 includes an antenna 12 coupled to circulator 14. The circulator 14 is coupled to a transmitter system 16 and a receiver system 18. A local oscillator block 20 provides the transmitter system 16 and the receiver system 18 with stable coherent local oscillator (LO) reference signals. The operation of radar 10 is controlled by a system control unit 24. One important function of system control 24 relates to the synchronization of the transmitter system 16 and receiver system 18 functions. This function requires stable coherent LO reference signals.

Transmitter system 16 includes a waveform generator 162 coupled to up-converter 160. Waveform generator 162 provides a pulse, or a series of pulses, to upconverter 160. Upconverter 160 modulates the pulses by multiplying them by an LO reference signal to thereby generate an RF pulse. Circulator 14 directs the RF signal to antenna 12. Antenna 12 radiates the RF signal into a predetermined coverage volume in accordance with the antenna design parameters. If there is a target disposed in the coverage volume, the radiated RF signal should be reflected by the target. A small portion of the reflected signal is captured by the antenna and directed into the receiver 18 via circulator 14.

The receiver 18 includes a downconverter 180 coupled to receiver front-end 182. Downconverter 180 amplifies and demodulates the incident reflected RF signal. Demodulation refers to the process of multiplying the received amplified signal by a LO reference signal to generate an analog signal characterized by a lower intermediate frequency (IF). The conversion from RF to IF is performed because IF signals are, in general, easier to process that are RF signals.

In any event, the IF signal is converted into digital data by receiver front end 182. Some of the more important receiver performance parameters include signal reception, signal-to-noise ratio (SNR), receiver bandwidth, and receiver sensitivity. Reception speaks to the receiver's ability to detect relatively weak signals. While the transmitter may provide several kilowatts of power, only a small fraction of that returns to the antenna in a reflected RF signal. Accordingly, the radar's ability to detect relatively weak signals determines the effective range of the radar. Every reflected return signal includes both the target's reflected signal and noise. The receiver sensitivity relates to the smallest return signal that the receiver is able to detect in a noisy environment. Sensitivity is usually specified in the milliwatt range.

The digital data may be in a single bit stream format or may employ complex signals that include in-phase and quadrature (I, Q) data signals. In any event, the receiver signal processor 184 correlates the received signal data with the transmitted signal to determine whether the data represents a legitimate target. The receiver signal processor 184 may perform many sophisticated calculations to distinguish a legitimate target echo from noise and background clutter. Doppler filtering may be employed to determine a target's velocity. Display 26 provides the processed data to the user in a user-recognizable format.

As those of ordinary skill in the art will appreciate, the Doppler effect relates to the apparent change in the frequency of a signal as the source of the signal moves relative to an observer. In everyday terms, the sounds made by a vehicle appear to change as it moves. The pitch increases as the vehicle moves toward us and decreases as the vehicle moves away. The Doppler effect applied to electromagnetic waves as well. A Doppler radar determines the radial velocity of a target by determining the frequency difference between the transmitted signal and the return signal. To put it simply, the frequency difference is proportional to the radial component of the target velocity. By measuring the Doppler effect, a Doppler radar is able to measure the velocity of a target as it moves in relation to the radar platform. Doppler radars are often used in military radar systems, weather radar, and in police radar guns. In fact, Doppler radar systems may be employed at the ballpark and be used to determine the speed of the pitcher's fastball.

A Doppler radar is a type of radar commonly referred to as a "coherent radar." In a coherent system, the radar receiver determines target information using the phase of the reflected signal as well as the frequency and amplitude. Coherent radars compare the phase and/or frequency of a reflected signal to phase and/or frequency of a signal generated by a stable local oscillator source. Local oscillator 20 coherency is required to maintain phase relationships between return detections within multiple pulses within a dwell. Those of ordinary skill in the art will understand that the receiver uses the reflected energy from multiple pulses to facilitate target detection. If the system is not coherent, the reflections will not add properly. Further, the local oscillator 20 is often required to tune and re-tune to other frequencies to support calibration or other secondary receiver functions. If the timing signals generated by the oscillator in a subsequent receive period are not coherent with the previous timing signals generated by the oscillator, receiver signal processing related to Doppler filtering operations will not be performed properly. For example, when the receiver attempts to correlate the return signals with the transmitted waveform, spurious signals may be generated and clutter may not be canceled.

Figure 2:
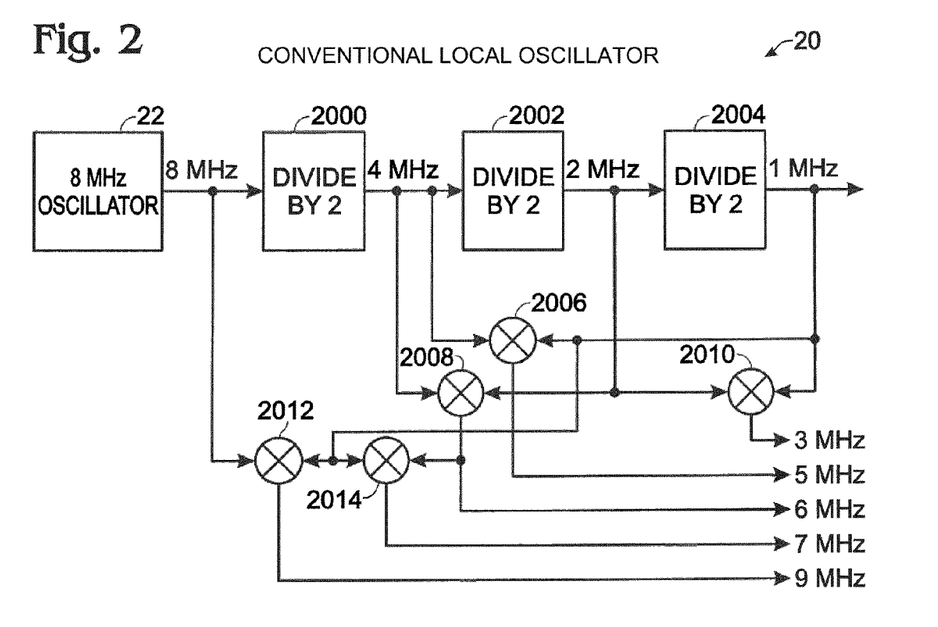
FIG. 2 is a block diagram of a conventional local oscillator depicted in FIG. 1.
Figure 3A:
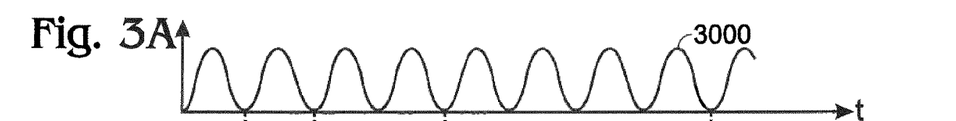
FIGS. 3A-3D are timing diagrams of waveform outputs for the local oscillator shown in FIG. 2.
Figure 3B:
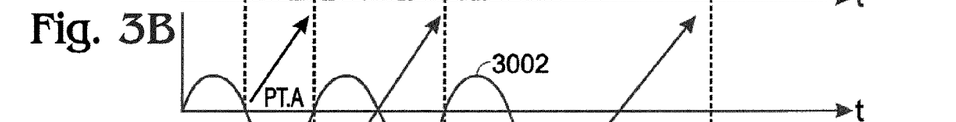
Figure 3C:
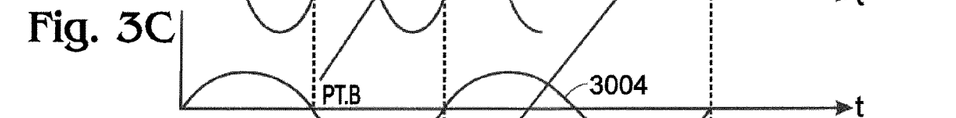
Figure 3D:
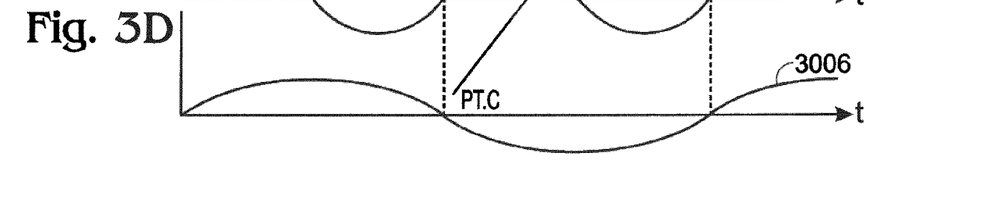

Referring to FIG. 2, a detailed block diagram of a conventional local oscillator 20 that may be employed in FIG. 1 is shown. System clock 22 (See FIG. 1) is configured in this example as an oscillator that provides an 8 MHz clock signal (FIG. 3A). FIGS. 3A-3D are timing diagrams of waveform outputs for the local oscillator shown in FIG. 2. Local oscillator 20 includes frequency synthesizer circuits (2000, 2002, 2004) disposed in series. FIG. 3B shows the 4 MHz output of synthesizer 200. FIG. 3C shows the 2 MHz output of synthesizer 202. Finally FIG. 3D shows the 1 MHz output of synthesizer 204. The local oscillator system 20 also includes several multipliers (2006-2014) that are used to mix the 3 MHz, 5 MHz, 6, MHz, 7 MHz, and 9 MHz clock signals used by the radar system 10. All told, local oscillator 20 provides unit frequency steps, i.e., 1-9 MHz signals in increments of 1 MHz. These different frequencies are used to tune the radar to different channels.

Because the oscillator and frequency synthesizers are always running, coherency is maintained over time. As noted above, local oscillator 20 is often required to switch between the various frequencies to support calibration or other secondary receiver functions.

Referring to FIG. 3A and FIG. 3B, if system control unit 24 orders LO 20 to switch between the 8 MHz signal 3000 to the 4 MHz signal 3002, and back again (See Pt. A), the phase of the 8 MHz clock 3000 is predictable because the clock has continued to run in synchronization with the 4 MHz clock signal 3002. If system control 24 selects the 2 MHz clock 3004 (FIG. 3C) and switches back to the 8 MHz clock 3000 at Pt. B, again, the phase of the 8 MHz clock 3000 is predictable and the receiver is able to perform coherent processing functions because there are no phase ambiguities when switching between frequency signals. FIG. 3D shows a 1 MHz clock 3006 which is shown to be in phase with the other clocks at Pt. C.

While the conventional local oscillator 20 shown in FIG. 2 provides coherent LO signals, the design has several drawbacks. The physical realization is relatively heavy, bulky, and power hungry. For example, the conventional local oscillator may occupy a volume that is greater than or equal to three cubic feet and dissipate over 200 W of power. Further, the circuit implementation requires additional components (not shown) for fine tuning resolution. This translates to higher cost. What is needed is a local oscillator that is lighter, more compact, less expensive, and more efficient from a power consumption standpoint than the conventional implementation.

Figure 4:
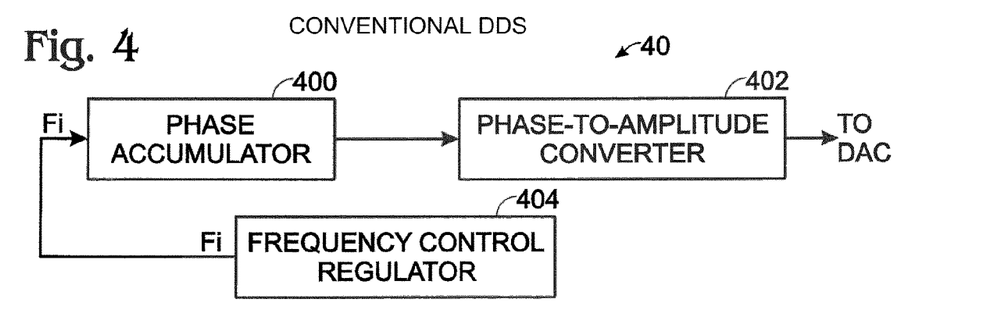
FIG. 4 is a block diagram of a portion of a conventional direct digital frequency synthesizer (DDS)

Referring to FIG. 4, a block diagram of a portion of a conventional direct digital frequency synthesizer (DDS) 40 is shown. This is an implementation of a local oscillator that is lighter, more compact, less expensive, and more efficient from a power consumption standpoint than the conventional implementation shown in FIG. 2. DDS 40 includes a phase accumulator 400 that is typically coupled to a frequency accumulator (not shown). The frequency accumulator may be programmed to sequence through a predetermined modulation sequence, such as a chirp sequence, for example. The phase accumulator 400 is implemented as a digital counter. Each increment of the phase accumulator generates a signal corresponding to a timing waveform. In particular, the output of the phase accumulator 400 is a digital representation of the advancing phase of a clock signal having a predetermined frequency; the output is subsequently directed into phase-to-amplitude converter 402. The predetermined frequency is determined by the input to the phase accumulator, known as the frequency tune word which is provided by frequency control register 404. This frequency tune word determines how quickly the phase accumulator 400 advances through the clock cycle. The output of the phase-to-amplitude converter 402 is provided to a digital-to-analog converter (DAC). The diagram of FIG. 4 may be implemented in an integrated circuit, such as an FPGA or an ASIC. Therefore, the conventional DDS represents an improvement with respect to size, weight, and power consumption vis ávis the conventional oscillator depicted in FIG. 2.

Figure 5:
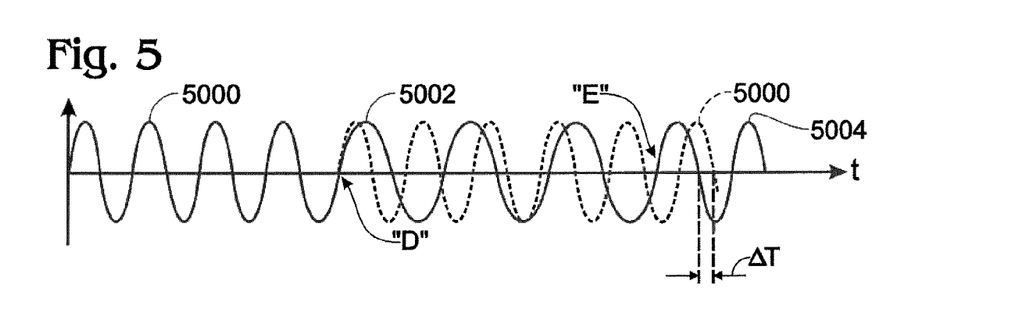
FIG. 5 is a timing diagram for the DDS depicted in FIG. 4.

However, as shown in FIG. 5, the DDS implementation has a major drawback in that it cannot provide multiple coherent frequency signals. Waveform 5000, for example, may represent the 8 MHz clock signal referred to above. At time (D), the frequency tune word register 404 is loaded to change the output frequency to a 6 MHz waveform 5002. FIG. 5 continues to show the 8 MHz signal as a dashed line for clarity of illustration. At time (E), the frequency tune word register 404 is again reloaded, this time to change the output frequency back to 8 MHz (See waveform 5004). Note that waveform 5004 is out of phase with respect to waveform 5000. As noted above, the phase ambiguity may prevent the receiver from properly performing Doppler processing, clutter cancellation and correlation filter functions.

What is needed, therefore, is a local oscillator implementation that provides stable coherent clock signaling in an implementation that is inexpensive, small in size and weight, and efficient from a power consumption standpoint. What is also needed is an oscillator that provides fine grain tuning resolution without the need for additional components.

SUMMARY OF THE INVENTION

The present invention addresses the needs described above by providing a digital local oscillator implementation that provides stable coherent clock signaling in an implementation that is small in size and weight, and efficient from a power consumption standpoint. The local oscillator of the present invention also provides fine grain tuning resolution without the need for additional components.

One aspect of the present invention is directed to an integrated circuit device that includes a primary signal synthesizer configured to generate a free-running first digital frequency signal and at least one secondary signal synthesizer disposed in parallel with the primary signal synthesizer and configured to generate a free-running at least one second digital frequency signal. A switch element includes a first switch input coupled to the primary signal synthesizer and at least one second switch input coupled to the at least one secondary signal synthesizer. The switch element is configured to select a switch output that provides either the free-running first digital frequency signal or the free-running at least one second digital frequency signal based on a switch control input.

In another aspect, the present invention is directed to a coherent radar system that includes an antenna system configured to radiate RF radar signals and receive ambient RF signals. A transmitter is coupled to the antenna system and configured to direct the RF radar signals into the antenna system. A receiver system is coupled to the antenna system and configured to detect RF radar return signals in the ambient RF signals, the detected RF radar return signals corresponding to the radiated RF radar signals. A digital local oscillator is coupled to the transmitter system and the receiver system. The digital local oscillator is implemented as an integrated circuit device. The digital local oscillator includes a primary frequency accumulator configured to generate a primary digital modulation signal corresponding to a predetermined primary modulation format. A primary phase accumulator is coupled in series with an output of the primary frequency accumulator. The primary phase accumulator is configured to generate a free-running primary digital frequency signal in accordance with a predetermined primary frequency. The digital local oscillator also includes at least one secondary frequency accumulator configured to generate at least one second digital modulation signal corresponding to at least one predetermined second modulation format. At least one secondary phase accumulator is coupled in series with the at least one secondary frequency accumulator. The at least one secondary phase accumulator is configured to generate a free-running at least one second digital frequency signal in accordance with at least one predetermined second frequency. A switch element includes a first switch input coupled to the primary phase accumulator and at least one second switch input coupled to the at least one secondary phase accumulator. The switch element is configured to provide a switch output that transmits either the free-running primary digital frequency signal or the free-running at least one second digital frequency signal based on a switch control input.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the coherent digital local oscillator of the present invention is shown in FIG. 6, and is designated generally throughout by reference numeral 20.

Figure 6:
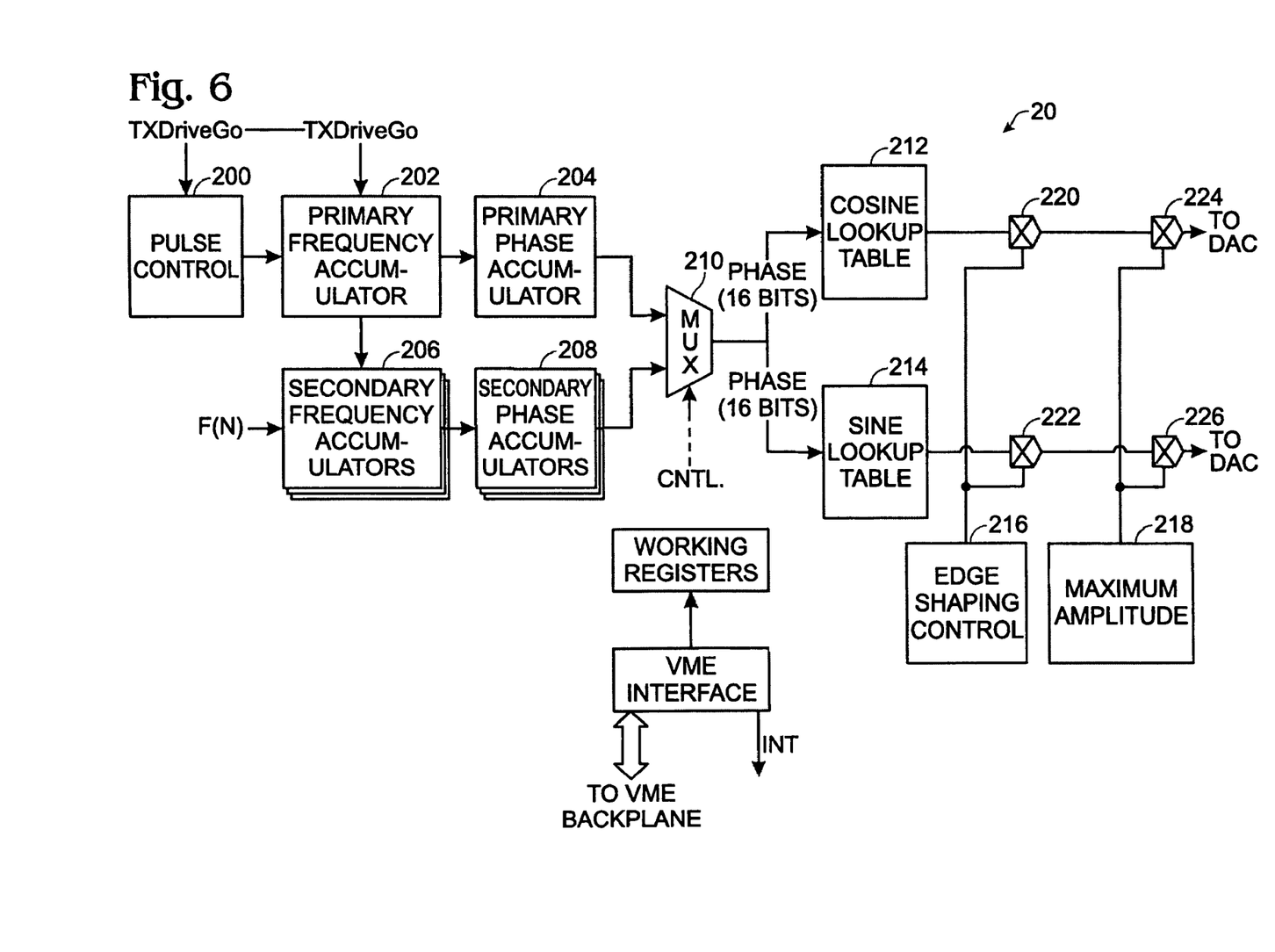
FIG. 6 is a coherent digital local oscillator in accordance with an embodiment of the present invention.

As embodied herein, and depicted in FIG. 6, a digital local oscillator (DLO) 20 in accordance with an embodiment of the present invention is disclosed. It will be apparent to those of ordinary skill in the pertinent art that modifications and variations can be made to DLO 20 of the present invention depending on the implementation of the circuit architecture. For example, DLO 20 may be implemented as an integrated device such as a field programmable gate array (FPGA). Those of ordinary skill in the art will also understand that DLO 20 may be implemented as an application specific integrated circuit (ASIC) or a customized integrated circuit.

DLO 20 includes a pulse control circuit 200 that provides pulse frequency data to the primary frequency accumulator 202. The primary frequency accumulator 202 is coupled in series to the primary phase accumulator 204. In similar fashion, at least one secondary frequency accumulator 206 may be coupled in series with a corresponding secondary phase accumulator 208. It will be understood that the present invention may be implemented by providing a third frequency accumulator in series with a third phase accumulator, the third series combination being disposed in parallel with the first and second series combinations of frequency and phase accumulators. Accordingly, those skilled in the art will understand that the present invention may accommodate N series combinations of frequency and phase accumulators disposed in parallel to the primary frequency accumulator 202 and primary phase accumulator 204. N is an integer value. The output of primary phase accumulator 204 and the output of the N-secondary phase accumulators 208 are coupled to the inputs of multiplexer switch 210. The control input to switch 210 determines which digital phase signal is provided to cosine look-up table (LUT) 212 and sine LUT 214. Those of ordinary skill in the art will understand that the digital signals provided by the phase accumulators may include any suitable number of bits, such as 8, 12, 16, 24, 32, and etc. The primary phase accumulator and the N-secondary phase accumulators are free-running signals that continuously increment with each system clock signal applied thereto.

LUT 212 is a memory device that stores data corresponding to the amplitude of the cosine wave as a function of advancing phase. Therefore, as each memory location is read, a digital word is retrieved. The sequence of digital words read from LUT 212 corresponds to the advancing phase of a cosine wave (i.e., over the interval of 0-2π radians, i.e., 0°-360°. Similarly, LUT 214 includes data corresponding to the amplitude of a sine wave as a function of phase. Thus, the phase signal provided by multiplexer 210 is employed as the address input to each LUT (212, 214). The selected phase accumulator, as noted above, is implemented as a counter, and is configured to cycle through the LUT addresses. Each of the N+1 series combinations of frequency and phase accumulators is configured to cycle through the memories at a different rate-the rate being determinative of the frequency.

Those of ordinary skill in the art will note that the cosine LUT 212 provides the in-phase (I) component of a complex signal, whereas the sine LUT 214 provides the quadrature (Q) component of the complex signal. Those of ordinary skill in the art will understand that in its trigonometric form, a complex signal may be expressed as: c=M[cos (Φ)+j sin (Φ)], M being the magnitude of the complex signal. Quadrature signals are often used in digital communications and radar applications because of the many advantages quadrature sampling provides in the receiver. For example, quadrature sampling techniques are often used to derive the instantaneous magnitude and phase of a signal during demodulation. As alluded to above, the receiver must be able to derive phase information if it is to perform coherent processing.

Referring back to FIG. 6, the I-data and the Q-data are provided to their respective digital-to-analog converters (DAC) after being conditioned by edge shaping control 216 and maximum amplitude block 218.

The pulse control block 200 may be of any suitable type depending on the predetermined characteristics of the transmitted RF signal pulses. In one embodiment of the present invention, pulse control block 200 is implemented as a non-linear frequency modulation (NLFM) chirp control module. NLFM chirps are employed to shape the energy spectrum and suppress range sidelobes. In contrast, some filtering techniques used in conventional systems for range sidelobe suppression in pulse-compression radars result in a degradation of the SNR at the receiver output. NLFM avoids this complication.

In other embodiments of the present invention, other modulation formats such as linear frequency modulation (LFM) pulse control may be implemented in accordance with the system application. For example, the present invention may be configured to accommodate modulation formats such as BPSK and FSK, again, depending on the application. Pulse control module 200 includes registers configured to receive the control bits that drive the frequency accumulators (202, 206) in accordance with the predetermined modulation format.

One of the salient features of the present invention relates to the parallel structure of the accumulators. The series combination of the primary frequency accumulator and the primary phase accumulator is configured to provide a primary frequency signal which is never retuned. Each series combination of a secondary frequency accumulator and a secondary phase accumulator is configured to provide one secondary frequency signal which may or may not be retuned, in accordance with various aspects of the design. For example, if coherent frequency switching is employed, the secondary frequency signals may be re-tuned. As such, the present invention may be configured to provide N+1 coherent frequency signals: the primary accumulator series structure in combination with N-secondary accumulator series structures. The phase accumulator outputs are continuously incrementing to provide free-running frequency signals.

Figure 7:
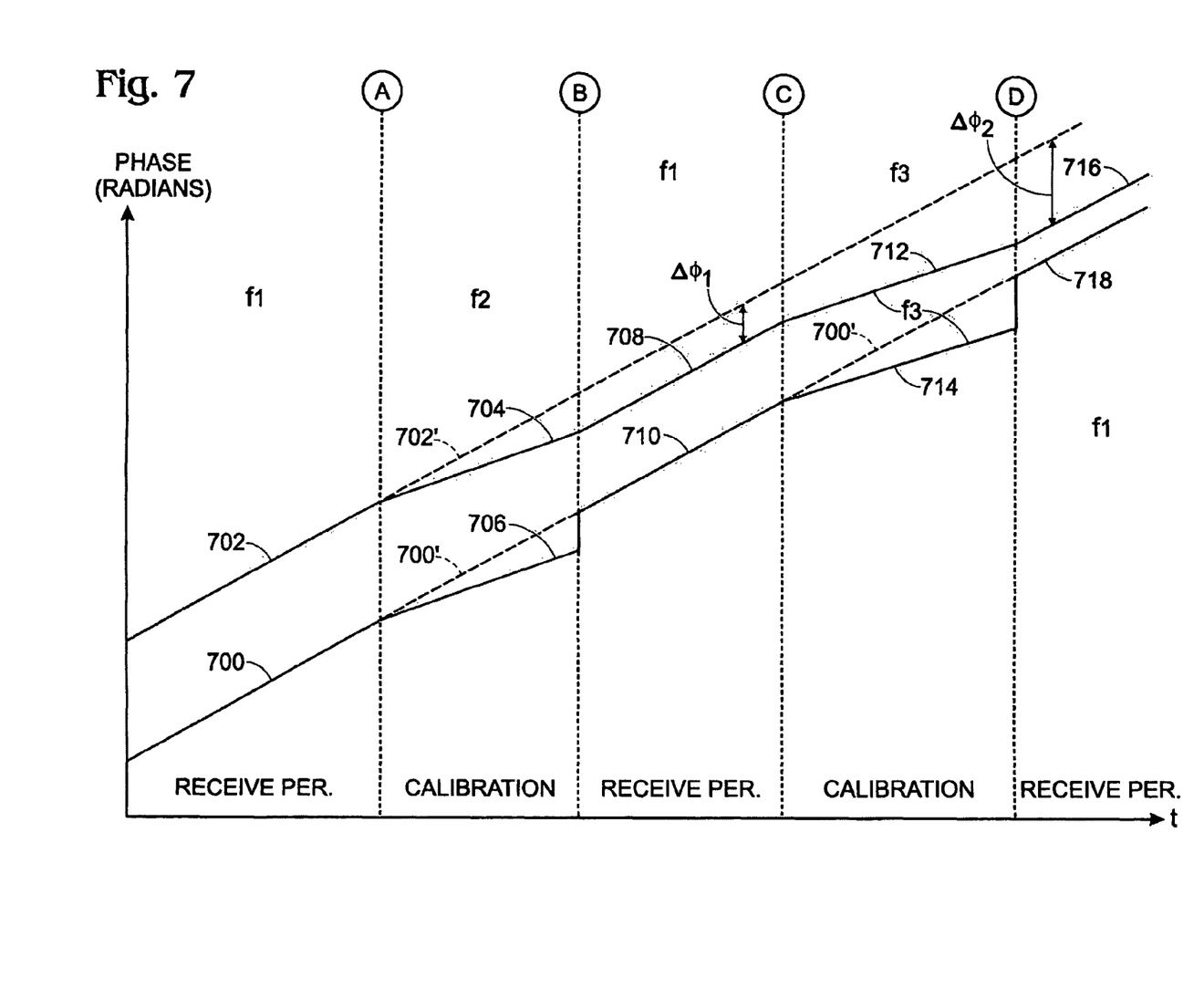
FIG. 7 is a chart comparing the performance of the present invention with a conventional DDS.

Referring to FIG. 7, a chart comparing the performance of DLO 20 with a conventional DDS is disclosed. Curve 700 represents an output of DLO 20 of the present invention during an initial receive period. Curve 702 represents the output of a conventional DDS in the same time frame. During the initial receive period, both DLO 20 and the conventional DDS output frequency signal $f_1$.

At Point (A), the control system timing transitions from a receive period into a calibration period. System timing requires the local oscillator to provide frequency signal $f_2$. Frequency signal $f_2$ is a different frequency and therefore the conventional DDS is retuned to provide output signal 704. Conversely, the control input to multiplexer 210 in DLO 20 is changed such that it provides the output of the selected secondary phase accumulator. The selected accumulator is configured to continuously generate frequency signal $f_2$. The dashed line 702' represents the position of line 702 had the accumulator continued to run coherently. A comparison of the line segments between time B and time C shows that in the lower line, line segment 706 transitions to line 710, which is collinear with the dashed line 700', indicating coherency. On the other hand, the upper line 704 transitions to line 708. However, line 708 is not collinear with line 702'. The signals are incoherent and are out of phase by an amount equal to $\Delta\Phi_1$.

At Point (B), the control system timing transitions from the calibration period back into a receive period. This necessitates a change from frequency signal $f_2$ to frequency signal $f_1$. When DLO 20 makes the transition back to frequency signal $f_1$, the control input to multiplexer 210 again selects primary phase accumulator 204 to provide output signal 710. Of course, output signal 710 and output signal 700 are the same signal at different points in time, both being derived from the series combination of the primary frequency accumulator 202 and primary phase accumulator 204 which is never retuned and runs continuously. Thus, signals 700 and 710 must be, and are, coherent. On the other hand, when the conventional DDS transitions back to frequency signal $f_1$ from signal $f_2$, DDS retunes to provide output signal 708, which is not coherent with the output signal 702 provided in the initial receive period. This incoherency is shown graphically as $\Delta\Phi_1$, which represents the phase difference between DDS output signal 702 and DDS output signal 708. Therefore, as radar system 10 attempts to perform coherent receive processing functions, the phase difference $\Delta\Phi_1$ represents an ambiguity that does not allow the receiver to properly use the necessary phase information for coherent receiver processing functions such as Doppler filtering, correlation filtering and the like.

At Point (C), the radar system transitions into another calibration period and the system timing requires the local oscillator to provide frequency signal $f_3$. At this point, conventional DDS retunes to provide the required frequency signal whereas DLO 20 selects the secondary phase accumulator output corresponding to frequency signal $f_3$, which is shown as line 714. In the subsequent receive period beginning at Point (D), the phase incoherency issues associated with the conventional DDS are shown graphically as $\Delta\Phi_2$, which represents the accumulated phase difference between DDS output signal 702 and DDS output signal 716. When DLO 20 makes the transition back to frequency signal $f_1$, the control input to multiplexer 210 again selects primary phase accumulator 204 to provide output signal 718. Of course, output signal 718 and output signal 700 are the same signal at different points in time, both being derived from the series combination of the primary frequency accumulator 202 and primary phase accumulator 204, which is never re-tuned and runs continuously. Thus, coherency is maintained.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having,""including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. An integrated circuit device comprising:
a primary signal synthesizer including a primary frequency accumulator in series with a primary phase accumulator, the primary frequency accumulator being configured to generate a primary digital modulation signal based on a predetermined modulation format and a primary frequency, the primary phase accumulator being configured to increment in response to a digital clock signal to thereby generate a free-running primary digital signal in accordance with the primary modulation signal;
at least one secondary signal synthesizer disposed in parallel with the primary signal synthesizer, the at least one secondary signal synthesizer including at least one secondary frequency accumulator in series with a corresponding one of at least one secondary phase accumulator, the at least one secondary frequency accumulator being configured to generate at least one secondary digital modulation signal based on at least one secondary frequency, the at least one secondary phase accumulator being configured to increment in response to the digital clock signal to thereby generate a free-running at least one secondary digital signal in accordance with the at least one secondary digital modulation signal; and
a switch element including a first switch input coupled to the primary signal synthesizer and at least one second switch input coupled to the at least one secondary signal synthesizer, the switch element being configured to select a switch output that provides either the primary digital signal or the at least one secondary digital signal based on a switch control input, a latter switch element output of the primary digital signal provided after the switch element output the at least one secondary digital signal being phase coherent with a former switch output of the primary digital signal provided before the switch element output the at least one secondary digital signal.

2. The integrated device of claim 1, wherein a latter switch element output of the at least one secondary digital signal provided after a switch element output of the primary digital signal being phase coherent with a former switch element output of the at least one secondary digital signal provided before the switch element output of the primary digital signal.

3. The integrated device of claim 1, further comprising a pulse control module coupled to an input of the primary frequency accumulator and an input of the at least one secondary frequency accumulator.

4. The integrated device of claim 3, wherein the pulse control module includes a modulation control circuit.

5. The integrated device of claim 4, wherein the modulation control circuit is configured to implement a modulation format including amplitude modulation, frequency modulation, and/or phase modulation.

6. The integrated device of claim 4, wherein the modulation control circuit is configured to implement a chirp modulation format.

7. The integrated device of claim 4, wherein the modulation control circuit is configured to implement a non-linear frequency modulation format.

8. The integrated device of claim 4, wherein the modulation control circuit is configured to implement a linear frequency modulation format.

9. The integrated device of claim 1, wherein the at least one secondary signal synthesizer further comprises N-secondary signal synthesizers, each of the N-secondary signal synthesizers being disposed in parallel with each other such that the switch element may be switched between N+1 inputs, N being an integer number.

10. The integrated device of claim 1, further comprising at least one look-up table (LUT) having address inputs coupled to the switch output, the at least one LUT having signal amplitude data stored therein, the signal amplitude data corresponding to a predetermined digital waveform.

11. The integrated device of claim 10, wherein the switch output is selected to apply the primary digital frequency signal to the address inputs when the primary signal synthesizer output is selected, the at least one LUT being configured to generate the predetermined digital waveform at the primary digital frequency.

12. The integrated device of claim 10, wherein the switch output is selected to apply the at least one secondary digital frequency signal to the address inputs when the at least one secondary signal synthesizer output is selected, the at least one LUT being configured to generate the predetermined digital waveform at the at least one secondary digital frequency.

13. The integrated device of claim 12, wherein the at least one secondary signal synthesizer further comprises N-secondary signal synthesizers, each of the N-secondary signal synthesizers being disposed in parallel with each other such that the switch output is configured to selectively apply one of N+1 digital frequency signals to the address inputs, N being an integer number.

14. The integrated device of claim 10, further comprising at least one digital-to-analog converter (DAC) coupled to the at least one LUT, the at least one DAC being configured to convert the predetermined digital waveform into a predetermined analog waveform.

15. The integrated device of claim 14, wherein the integrated device is implemented as an ASIC, and wherein the at least one DAC is an integrated part of the ASIC.

16. The integrated device of claim 14, wherein the integrated device is implemented as FPGA, and wherein the at least one DAC is not an integrated component disposed in the FPGA.

17. The integrated device of claim 10, wherein the at least one LUT includes an in-phase LUT configured to output a cosine digital waveform and a quadrature LUT configured to output a sine digital waveform, the cosine digital waveform and the sine digital waveform having a predetermined frequency determined in accordance with the switch control input.

18. The integrated device of claim 17, further comprising a first DAC coupled to an output of the in-phase LUT and a second DAC coupled to an input of the quadrature DAC.

19. The integrated device of claim 1, wherein the at least one secondary signal synthesizer further comprises N-secondary signal synthesizers, each of the N-secondary signal synthesizer being disposed in parallel with the primary signal synthesizer, the N-secondary signal synthesizers being and configured to generate a N-free running digital frequency signals, each of the N-free running digital frequency signals and the free-running first digital frequency signals having a different frequency and are phase coherent.

20. A coherent radar system comprising:
an antenna system configured to radiate RF radar signals and receive ambient RF signals;
a timing circuit configured to provide a digital clock signal;

a transmitter coupled to the antenna system and configured to direct the RF radar signals into the antenna system;

a receiver system coupled to the antenna system and configured to detect RF radar return signals in the ambient RF signals, the detected RF radar return signals corresponding to the radiated RF radar signals; and a digital local oscillator coupled to the transmitter system and the receiver system, the digital local oscillator being implemented as an integrated circuit device, the digital local oscillator including, a primary frequency accumulator configured to generate a primary digital modulation signal corresponding to a predetermined primary modulation format and a predetermined primary frequency, a primary phase accumulator coupled in series with an output of the primary frequency accumulator, the primary phase accumulator being configured to increment in response to the digital clock signal to thereby generate a free-running primary digital frequency signal in accordance with the primary digital modulation signal, at least one secondary frequency accumulator configured to generate at least one second digital modulation signal corresponding to at least one secondary frequency, at least one secondary phase accumulator coupled in series with the at least one secondary frequency accumulator, the at least one secondary phase accumulator being configured to increment in response to the digital clock signal to thereby generate a free-running at least one second digital frequency signal in accordance with at least one second digital modulation signal, and a switch element including a first switch input coupled to the primary phase accumulator and at least one second switch input coupled to the at least one secondary phase accumulator, the switch element being configured to provide a switch output that transmits either the free-running primary digital frequency signal or the free-running at least one second digital frequency signal based on a switch control input, a latter occurrence of the primary digital frequency signal provided after an occurrence of the at least one secondary digital frequency signal being phase coherent with a former occurrence of the primary digital frequency signal provided before the occurrence of the at least one secondary digital frequency signal, and a latter occurrence of the at least one secondary digital frequency signal provided after an occurrence of the primary digital frequency signal being phase coherent with a former occurrence of the at least one secondary digital frequency signal provided before the occurrence of the primary digital frequency signal.

21. The radar system of claim 20, further comprising a pulse control module coupled to an input of the primary frequency accumulator and an input of the secondary frequency accumulator, the pulse control module being configured to provide modulation format data.

22. The radar system of claim 21, wherein the pulse control module includes a non-linear frequency modulation chirp control circuit.

23. The radar system of claim 21, wherein the pulse control module includes a linear frequency modulation chirp control circuit.

24. The radar system of claim 20, wherein the at least one a secondary frequency accumulator further comprises N-secondary frequency accumulators and the at least one a secondary phase accumulator further comprises N-secondary phase accumulators each coupled to a corresponding one of the N-secondary frequency accumulators, each series combination of a secondary frequency accumulator and secondary phase accumulator being disposed in parallel with the N−1 remaining series combinations of secondary frequency accumulators and secondary phase accumulators such that the switch element may be switched between N+1 inputs, N being an integer number.

25. The radar system of claim 24, further comprising at least one look-up table (LUT) having address inputs coupled to the switch output, the at least one LUT having signal amplitude data stored therein, the signal amplitude data corresponding to a predetermined digital waveform.

26. The radar system of claim 25, wherein the switch output is selected to apply the primary digital frequency signal to the address inputs when the primary phase accumulator output is selected, the at least one LUT being configured to generate the predetermined digital waveform at the primary digital frequency.

27. The radar system of claim 25, wherein the switch output is selected to apply one of N-secondary digital frequency signals to the address inputs when one of the N-secondary phase accumulator outputs is selected, the at least one LUT being configured to generate the predetermined digital waveform at a secondary digital frequency corresponding to the selected one of N-secondary digital frequency signals.

28. The radar system of claim 25, further comprising at least one digital-to-analog converter (DAC) coupled to the at least one LUT, the at least one DAC being configured to convert the predetermined digital waveform into a predetermined analog waveform.

29. The radar system of claim 28, wherein the at least one LUT includes an in-phase LUT configured to output a cosine digital waveform and a quadrature LUT configured to output a sine digital waveform, the cosine digital waveform and the sine digital waveform having a predetermined frequency determined in accordance with the switch control input.

30. The radar system of claim 28, further comprising a first DAC coupled to an output of the in-phase LUT and a second DAC coupled to an output of the quadrature LUT.

31. The radar system of claim 20, wherein the radar system is a pulsed radar system.

32. The radar system of claim 20, wherein the receiver is configured to perform Doppler processing functions.

33. The radar system of claim 20, wherein the integrated device is a FPGA.

34. The radar system of claim 33, wherein the FPGA is coupled to a DAC.

35. The radar system of claim 20, wherein the integrated device is an ASIC.

36. The system of claim 20, wherein the at least one secondary signal synthesizer further comprises N-secondary signal synthesizers, each of the N-secondary signal synthesizer being disposed in parallel with the primary signal synthesizer, the N-secondary signal synthesizers being and configured to generate a N-free running digital frequency signals, each of the N-free running digital frequency signals and the free-running first digital frequency signals having a different frequency and are phase coherent.

* * * * *